US008647482B2

(12) United States Patent
Huang (10) Patent No.: US 8,647,482 B2
(45) Date of Patent: Feb. 11, 2014

(54) ELECTROCHEMICAL-CATALYTIC CONVERTER FOR EXHAUST EMISSION CONTROL

(75) Inventor: Ta-Jen Huang, Hsin (TW)

(73) Assignee: National Tsing Hua University, Hsinchu (TW)

( * ) Notice: Subject to any disclaimer, the term of this patent is extended or adjusted under 35 U.S.C. 154(b) by 252 days.

(21) Appl. No.: 13/037,693

(22) Filed: Mar. 1, 2011

(65) Prior Publication Data

US 2012/0103795 A1 May 3, 2012

(30) Foreign Application Priority Data

Oct. 29, 2010 (TW) .............................. 99137174 A (51) Int. Cl.

| C25B 9/10 | (2006.01) |
|---|---|
| B01D 53/32 | (2006.01) |
| B01D 53/56 | (2006.01) |
| B01D 53/72 | (2006.01) |
| B01D 53/92 | (2006.01) |
| H01M 8/12 | (2006.01) |

(52) U.S. Cl.
USPC ........... 204/262; 204/241; 204/274; 204/248; 205/412; 429/429; 429/434; 429/497

(58) Field of Classification Search
None
See application file for complete search history.

(56) References Cited

U.S. PATENT DOCUMENTS

| 3,843,950 | A | * | 10/1974 | Schladitz ...................... 338/208 |
|---|---|---|---|---|
| 5,224,346 | A | * | 7/1993 | Berriman et al. ............... 60/274 |
| 5,306,411 | A | * | 4/1994 | Mazanec et al. ............. 204/265 |
| 5,401,372 | A | | 3/1995 | Liu et al. |
| 6,287,527 | B1 | * | 9/2001 | Kawanami et al. ........ 423/213.2 |
| 2009/0169940 | A1 | * | 7/2009 | Ohmori et al. .................. 429/26 |

* cited by examiner

*Primary Examiner* — Harry D Wilkins, III
(74) *Attorney, Agent, or Firm* — Muncy, Geissler, Olds & Lowe, PLLC (57) ABSTRACT

The present invention discloses an electrochemical-catalytic converter, which can remove nitrogen oxides ($NO_x$), carbon monoxide (CO), hydrocarbons (HCs) and particulate matter (PM) in exhaust gas. The electrochemical-catalytic converter comprises a cell module, wherein nitrogen oxides are decomposed to form nitrogen through electrochemical promotion, and wherein carbon monoxide, hydrocarbons and particulate matter are catalyzed to form carbon dioxide and water by an oxidation catalyst.

16 Claims, 4 Drawing Sheets

ELECTROCHEMICAL-CATALYTIC CONVERTER FOR EXHAUST EMISSION CONTROL

FIELD OF THE INVENTION

The present invention relates to an electrochemical-catalytic converter, particularly to an electrochemical-catalytic converter for controlling exhaust emission to effectively reduce nitrogen oxides ($NO_x$), carbon monoxide (CO), hydrocarbons (HCs) and particulate matter (PM) in exhaust gas.

BACKGROUND OF THE INVENTION

Air is indispensable for the living of human beings. Fresh and clean air is essential for the health of people. The remarkable advancement of science and technology has brought the prosperous development of economics. However, the exhaust emission of automobiles, factories and other combustion sources has become the main source of air pollution and greatly degraded the quality of air.

Take automobiles for an example. The vehicle exhaust emission standard is growing more and more stringent. However, the air pollution caused by vehicles is still getting more and more serious because the number of vehicles increases day by day. Generally, different types of fuels are burned in a cylinder to release thermal energy and generate dynamic power for engine operation of an automobile. However, the combustion of fuel also generates exhaust gases including harmful pollutants, such as nitrogen oxides ($NO_x$), carbon monoxide (CO), hydrocarbons (HCs), particulate matter (PM) and the like. These pollutants not only form photochemical smog, but also destroy the ozone layer, aggravate the greenhouse effect, cause acid rain, damage ecological environment, and harm health of human beings.

Incomplete combustion generates carbon monoxide, which combines with hemoglobin to form carboxyhemoglobin (COHb). The hemoglobin's combination affinity for carbon monoxide is 300 times greater than that for oxygen. Thus, too high a concentration of carbon monoxide in air will affect the oxygen delivery ability of hemoglobin. A nitrogen oxide comes from the chemical combination of nitrogen and oxygen and is usually exhausted in form of nitric oxide (NO) or nitrogen dioxide ($NO_2$). After illuminated by ultraviolet (UV), nitrogen oxides react with hydrocarbons to form toxic photochemical smog which has special smell, irritates people's eyes, injures plants, and reduces visibility in atmosphere. Also nitrogen oxides react with moisture in the air to form nitric acid and nitrous acid which are elements of acid rain. A low concentration of hydrocarbon will irritate the respiratory system. A higher concentration of hydrocarbon will affect the function of the central nervous system.

Therefore, many regions, including European Union, USA, Japan and the Republic of China, have established stringent exhaust emission standards, such as US Bin5 and Euro6, which regulate the exhaust emission standards of nitrogen oxides ($NO_x$), carbon monoxide (CO), hydrocarbons (HCs) and particulate matter (PM) to control and decrease the emission of polluting gases and encourage the manufacturers to produce, develop or introduce the latest products adopting pollution prevention technologies.

In the conventional emission control technology for lean burn exhaust, no single device or converter can simultaneously undertake the conversion of nitrogen oxides ($NO_x$), carbon monoxide (CO), hydrocarbons (HCs) and particulate matter (PM). Catalytic converters of automobile emission systems for the lean burn exhaust can catalyze the oxidation of carbon monoxide and hydrocarbons. Catalytic particulate filters can trap and oxidize the particulate matter. Another auxiliary device or system is needed to convert nitrogen oxides. For example, in addition to an oxidizing catalytic converter for oxidation of carbon monoxide and hydrocarbons, most of the tailpipes of current diesel vehicles are equipped with an EGR (Exhaust Gas Recirculation) system to control emission of nitrogen oxides. The latest diesel vehicles may be equipped with an SCR (Selective Catalytic Reduction) system to reduce nitrogen oxides.

The SCR system adopts ammonia ($NH_3$) or aqueous solution of urea ($CO(NH_2)_2$) as the reactant. The aqueous solution of urea is injected into the tailpipe via a nozzle and reacted with water to form ammonia. The ammonia reacts with nitrogen oxides to generate nitrogen ($N_2$) and water ($H_2O$). However, ammonia is toxic and hard to store and may leak. The incomplete reaction of ammonia causes secondary pollution. Further, the SCR system is bulky and needs to be equipped with precision sensors to provide auxiliary control.

An U.S. Pat. No. 5,401,372 discloses an "Electrochemical Catalytic Reduction Cell for the Reduction of $NO_x$ in an $O_2$-Containing Exhaust Emission", which is a device dedicated to remove nitrogen oxides, and which utilizes electrochemical catalytic reduction reaction and adopts vanadium pentaoxide ($V_2O_5$) as the catalyst to convert nitrogen oxides into nitrogen. The device has to add a power supply to operate the electrochemical cell thereof. Thus the device of this prior art not only consumes energy resources, but also cannot remove harmful exhaust gases simultaneously.

An U.S. application Ser. No. 12/774,180 proposed by the same Inventor and entitled "Electrochemical-catalytic Converter for Exhaust Emission Control with Power Generation" discloses a converter to convert the exhaust gas into the electric energy, not only the harmful components in the exhaust gas can be converted into harmless components, but also power generation can be achieved. However, the converter in this prior art is additionally supplied by the external fuel to operate a solid oxide fuel cell (SOFC) in the converter, the fuel is consumed and a fuel processing system has to be installed on the vehicle. Thus the fixed and operating costs are increased, and the lifespan of the device is shortened due to accumulation of carbon caused by the fuel.

SUMMARY OF THE INVENTION

The objective of the present invention is to provide an electrochemical-catalytic converter for controlling exhaust emission and removing the nitrogen oxides, carbon monoxide, hydrocarbons and particulate matter in the exhaust gas without consuming fuel.

To achieve the abovementioned objective, the present invention proposes an electrochemical-catalytic converter, which comprises at least one cell module, a reducing gas input unit, a reducing gas output unit, a reducing gas circulating pump, an exhaust gas input unit, and an exhaust gas output unit. The cell module includes a cathode compartment, an anode compartment, a membrane-electrode assembly and a heating unit stacked one by one. The membrane-electrode assembly is interposed between the cathode compartment and the anode compartment. The cathode compartment includes an oxidation catalyst. The heating unit is embedded in the cell module. The reducing gas input unit and the reducing gas output unit are respectively coupled to two sides of the anode compartment to function as the reducing gas input terminal and the reducing gas output terminal of the cell module while operating, and the reducing gas circulating pump is used to perform closed circulation of reducing gas. The exhaust gas input unit and the exhaust gas output unit are respectively coupled to two sides of the cathode compartment to function as the exhaust gas input terminal and the exhaust gas output terminal of the cell module to be treated as desired.

The heating unit heats the membrane-electrode assembly to a working temperature to make the reducing gas to generate electromotive force in the membrane-electrode assembly. The nitrogen oxides in the exhaust gas are decomposed to form nitrogen electrochemically promoted by the electromotive force in the membrane-electrode assembly. The carbon monoxide, hydrocarbons and particulate matter in the exhaust gas are catalyzed to form carbon dioxide and water by the oxidation catalyst. Thereby, the exhaust gas is decontaminated.

According to the above description, the harmful components in the exhaust gas can be effectively removed through the electrochemical promotion of decomposition reaction and catalytic oxidation reaction. As compared to the prior art, the present invention has better exhaust gas treating mechanism which integrates $NO_x$ reduction system needed in the prior art and the oxidation catalytic converter into a single unit to have better exhaust gas treating efficiency. Furthermore, compared to exhaust gas conversion and power generation structure in the prior art, the present invention simplifies the circuit system to achieve low-cost and easy manufacturing advantages. The reducing gas is repeatedly used via the reducing gas circulating pump in the invention, thus it does not need to install the fuel processing system to generate the reducing gas, thereby the fixed and operating costs can be reduced, and the lifespan of the device can be improved by selecting the reducing gas without accumulating carbon on the anode side.

Below, the technical contents of the present invention are described in detail with the embodiments in cooperation with the drawings.

BRIEF DESCRIPTION OF THE DRAWINGS

The embodiments of the present invention are described in accompany with the following drawings. FIG. 1 is assigned to be the representative drawing of the invention.

DETAILED DESCRIPTION OF THE PREFERRED EMBODIMENTS

The present invention proposes an electrochemical-catalytic converter for reducing nitrogen oxides ($NO_x$), carbon monoxide (CO), hydrocarbons (HCs) and particulate matter (PM) in an exhaust gas. The electrochemical-catalytic converter of the present invention can be applied to various exhaust emission devices, such as the chimneys of factories and the exhaust emission devices of generators, automobiles and boats. There is no limitation to the exhaust emission device in the present invention. In the present invention, the "exhaust gas" is referred to the gas to be decontaminated and includes at least one of the harmful components mentioned above. Therefore, the exhaust gas does not necessarily include all of the four abovementioned harmful components. The technical contents of the present invention are described in detail in cooperation with the drawings below.

Figure 1:
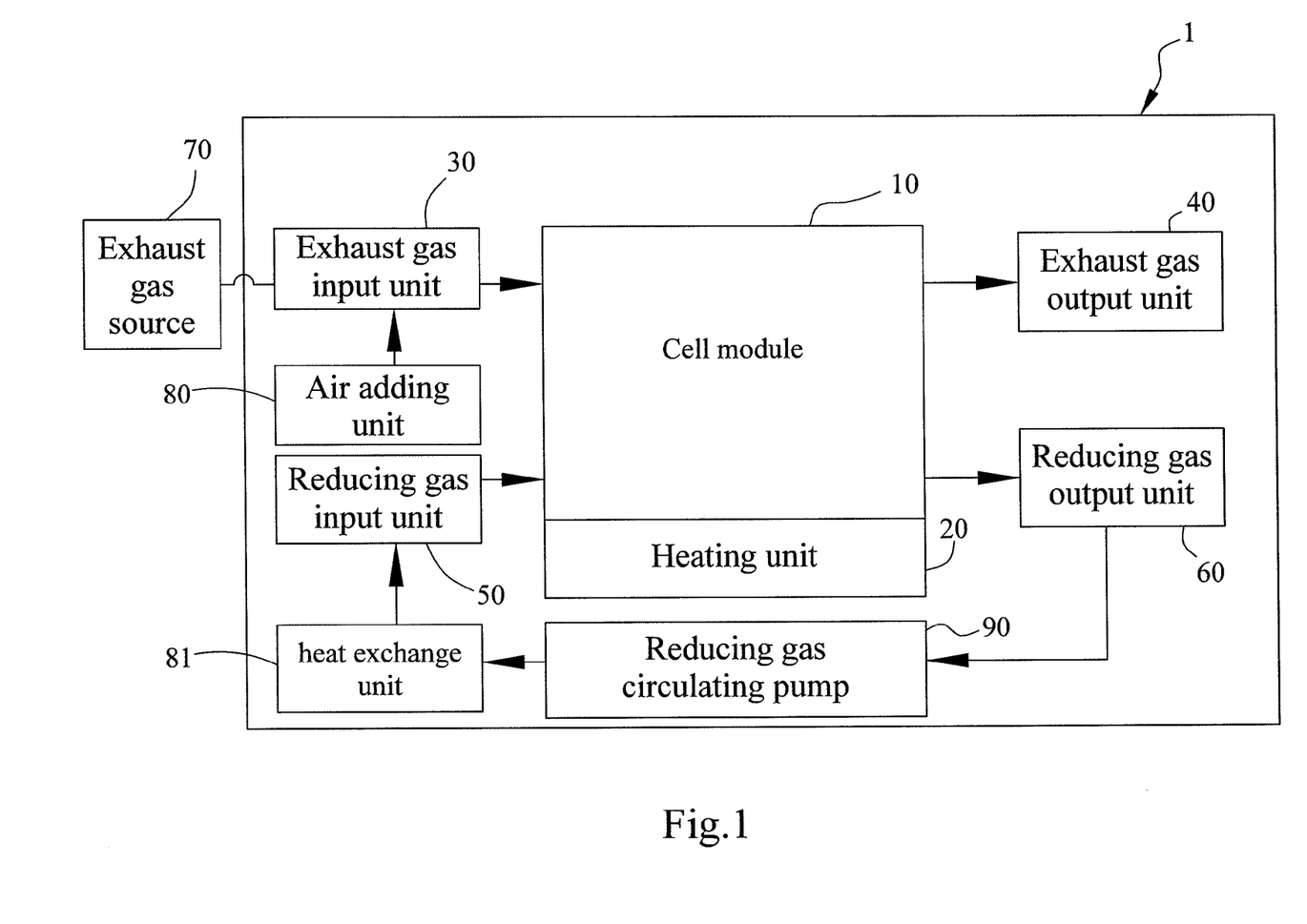
FIG. 1 is a diagram schematically showing the system of an electrochemical-catalytic converter according to one embodiment of the present invention.
Figure 2:
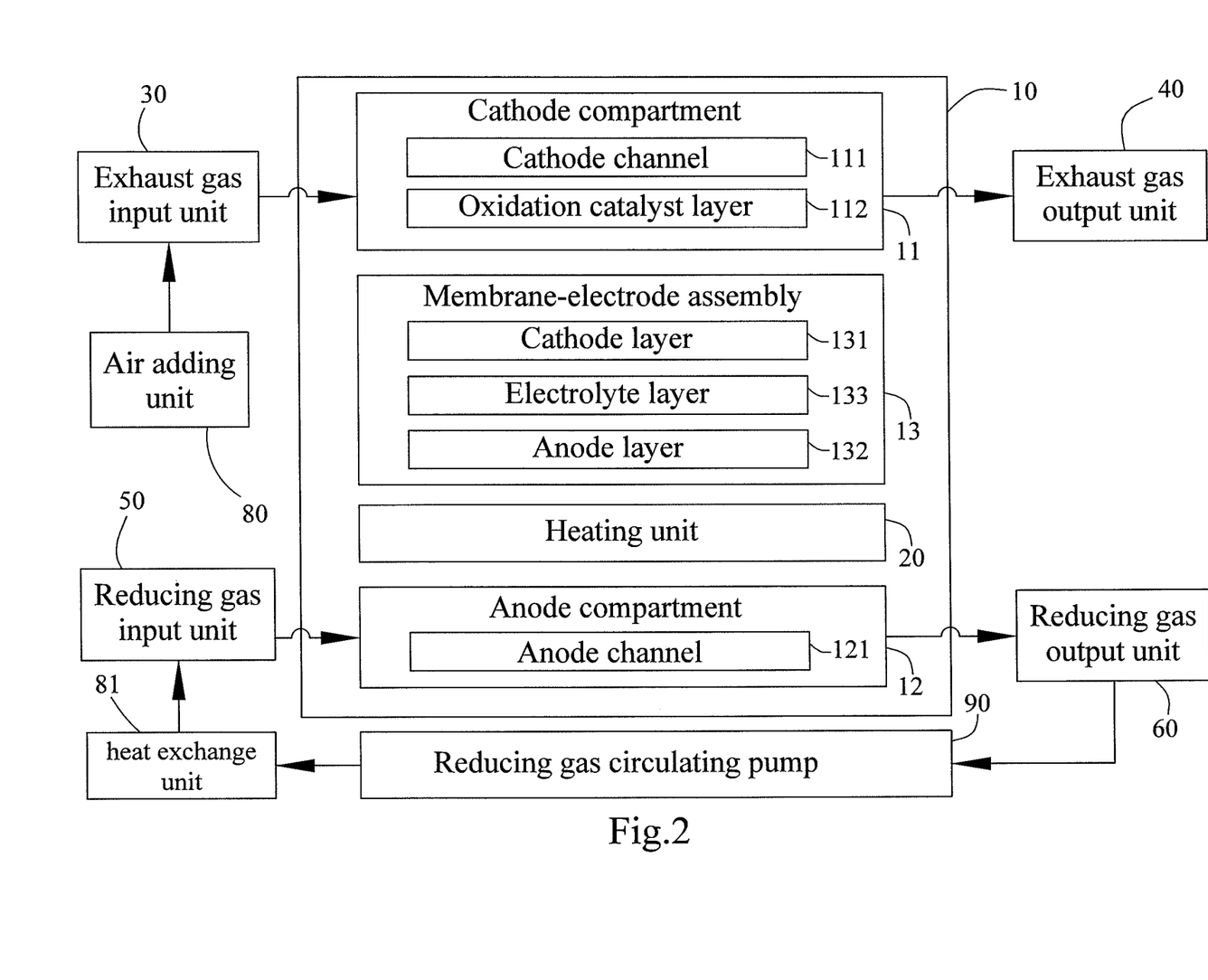
FIG. 2 is a diagram schematically showing the architecture of a cell module of an electrochemical-catalytic converter according to one embodiment of the present invention.

Refer to FIGS. 1-2 respectively showing the converter system and the cell module architecture according to the present invention. The electrochemical-catalytic converter 1 of the present invention comprises a cell module 10, a heating unit 20, an exhaust gas input unit 30, an exhaust gas output unit 40, a reducing gas input unit 50, a reducing gas output unit 60, and a reducing gas circulating pump 90. The heating unit 20 is used to heat the cell module 10 to a working temperature. The exhaust gas input unit 30 and the exhaust gas output unit 40 are coupled to the cell module 10 and respectively function as the input terminal and the output terminal of the cell module 10 for decontaminating the exhaust gas. The exhaust gas input unit 30 may receive exhaust gas from an exhaust gas source 70, such as a boiler, a generator, a chimney, or a vehicle engine. The exhaust gas input unit 30 may include an air adding unit 80 for adding air into the exhaust gas; the air adding unit 80 may be an air pump. The reducing gas input unit 50 and the reducing gas output unit 60 are coupled to the cell module 10 and the reducing gas circulating pump 90 and respectively function as the reducing gas input terminal and the reducing gas output terminal of the cell module 10 for operating. The reducing gas input unit 50 may include a reducing gas tank (not shown in the drawings) for storing reducing gas and delivering the reducing gas to the reducing gas input terminal. The reducing gas tank has expanding-contracting capability to adjust the pressure of the reducing gas during its heating and cooling. The reducing gas circulating pump 90 may include a heat exchange unit 81 to regulate temperature of the reducing gas.

The cell module 10 may be an SOFC (Solid Oxide Fuel Cell) stacking structure, such as a tubular or planar SOFC stacking structure. However, the present invention does not limit the cell module 10 to be an SOFC stacking structure. The cell module 10 further comprises a cathode compartment 11, an anode compartment 12 and a membrane-electrode assembly (MEA) 13, which are stacked one by one with the membrane-electrode assembly 13 interposed between the cathode compartment 11 and the anode compartment 12.

The membrane-electrode assembly 13 further comprises a cathode layer 131, an anode layer 132 and an electrolyte layer 133, and the electrolyte layer 133 is interposed between the cathode layer 131 and the anode layer 132. The electromotive force of the present invention is generated in the membrane-electrode assembly 13. The electrolyte layer 133 separates the gases respectively existing in the cathode layer 131 and the anode layer 132.

In one embodiment, the electrolyte layer 133 is a solid electrolyte which is a non-porous membrane structure able to separate the gases at two sides and conduct ions. The electrolyte layer 133 is made of a material selected from a group consisting of fluorite oxides, perovskite oxides, and the combinations thereof, such as fluorite YSZ (yttria-stabilized zirconia), stabilized zirconia, fluorite GDC (gadolinia-doped ceria), doped ceria, perovskite LSGM (strontium/magnesium-doped lanthanum gallate), and doped lanthanum gallate.

The cathode layer 131 and the anode layer 132 are respectively made of porous materials. In one embodiment, the anode layer 132 is made of a material selected from a group consisting of cermet of nickel and fluorite oxides, perovskite oxides, fluorite oxides, metal-added perovskite oxides, metal-added fluorite oxides, and the combinations thereof, such as Ni—YSZ (nickel-yttria-stabilized zirconia) cermet and Ni-GDC (nickel-gadolinia-doped ceria) cermet. The cathode layer 131 is made of a material selected from a group consisting of perovskite oxides, fluorite oxides, metal-added perovskite oxides, metal-added fluorite oxides, and the combinations thereof, such as perovskite lanthanum strontium cobalt oxides, lanthanum strontium manganese oxides, the combination of lanthanum strontium cobalt oxides and gadolinia-doped ceria, the combination of lanthanum strontium manganese oxides and gadolinia-doped ceria, vanadium-added lanthanum strontium cobalt oxides, vanadium-added lanthanum strontium manganese oxides, the combination of vanadium-added lanthanum strontium cobalt oxides and gadolinia-doped ceria, and the combination of vanadium-added lanthanum strontium manganese oxides and gadolinia-doped ceria.

Two ends of the cathode compartment 11 are respectively coupled to the exhaust gas input unit 30 and the exhaust gas output unit 40. The cathode compartment 11 has a cathode channel 111 and an oxidation catalyst layer 112 made of oxidation catalyst. The oxidation catalyst may cover the surface of the cathode channel 111 or the oxidation catalyst layer 112 is a porous layer interposed between the cathode layer 131 and the cathode channel 111 to catalyze the oxidation reaction of the gas. Two sides of the cathode channel 111 are respectively coupled to the exhaust gas input unit 30 and the exhaust gas output unit 40.

Two ends of the anode compartment 12 are respectively coupled to the reducing gas input unit 50 and the reducing gas output unit 60. The anode compartment 12 has an anode channel 121. In this embodiment, the heating unit 20 is interposed between the anode channel 121 and the membrane-electrode assembly 13. Two sides of the anode channel 121 are respectively coupled to the reducing gas input unit 50 and the reducing gas output unit 60 and the reducing gas circulating pump 90 to perform closed circulation of the reducing gas.

The exhaust gas input unit 30 inputs the exhaust gas that is to be decontaminated to the cathode channel 111 of the cathode compartment 11. The nitrogen oxides in the exhaust gas are delivered to the cathode layer 131 and decomposed to form nitrogen. The carbon monoxide, hydrocarbons and particulate matter in the exhaust gas are oxidized to form carbon dioxide and water via the oxidation catalyst layer 112. Then, the unreacted exhaust gas and the reacted gas are transferred from the cathode channel 111 to the exhaust gas output unit 40 to be exhausted. The reducing gas input unit 50 transfers the reducing gas from the reducing gas circulating pump 90 to the anode channel 121 of the anode compartment 12. The reducing gas in the anode channel 121 is delivered to the anode layer 132 to generate electromotive force. Then, the reducing gas is transferred to the reducing gas circulating pump 90 to perform closed circulation through the reducing gas output unit 60. In one embodiment, the heat exchange unit 81 is placed between the reducing gas circulating pump 90 and the reducing gas input unit 50 to regulate temperature of the reducing gas; however, the heat exchange unit 81 may also be placed between the reducing gas output unit 60 and the reducing gas circulating pump 90.

In the cell module 10 of the present invention, the harmful components in the exhaust gases are removed via the catalytic decomposition reaction of the cathode layer 131 promoted by the electromotive force in the membrane-electrode assembly 13 and the catalytic oxidation reaction in the cathode compartment 11. The catalytic and electrochemical reactions respectively in the cathode layer 131 and the anode layer 132, and the reactions of the abovementioned harmful gases will be described in detail below.

In the present invention, the reducing gas may be hydrogen ($H_2$), a mixed gas of carbon monoxide and carbon dioxide, a mixed gas (synthetic gas) of carbon monoxide and hydrogen, and natural gas, etc. The reducing gas is input to the anode compartment 12 by the reducing gas input unit 50. The reducing gas in the anode layer 132 generates the electromotive force ($\Delta E$) in the membrane-electrode assembly 13. The electromotive force is an open-circuit voltage (OCV) and can be expressed by Formula (1):

$$\Delta E(OCV) = [(RT)/(4F)] \cdot \ln [(P_{O2\mid Cathode})/(P_{O2\mid Anode})] \quad (1)$$

wherein R is the gas constant, T is the absolute temperature, F is the Faraday constant, $P_{O2}$ is the oxygen partial pressure. On the anode side, different types of reducing gases correspond to different values of the oxygen partial pressure, thus different electromotive forces could be generated; on the cathode side, different oxygen concentration also correspond to different values of the oxygen partial pressure, thus different electromotive forces could be generated as well. In other words, if oxygen content in the exhaust gas on the cathode side is higher, then the electromotive force is greater, and thus the electrochemical promotion ability of nitrogen oxides being decomposed into nitrogen is greater in the invention. In one embodiment, when the oxygen concentration in the exhaust gas is too low for an effective generation of the electromotive force, the air adding unit 80 can be used to add extra air into the exhaust gas to increase the oxygen concentration, thus the generated electromotive force is increased. The reducing gas circulating pump 90 is used to perform circulation of the reducing gas to promote the reducing gas effectively into the anode layer 132 and evenly distributed therein, so that the electromotive force is generated efficiently and uniformly, and thus the electrochemical promotion ability of nitrogen oxides being decomposed into nitrogen is effectively obtained and uniformly distributed.

The harmful components of the exhaust gases are converted into harmless gases in the cathode compartment 11 and the cathode layer 131. The harmful nitrogen oxides are mainly nitric oxide (NO) and nitrogen dioxide ($NO_2$). Nitric oxide (NO) is decomposed into nitrogen and oxygen in the cathode layer 131 according to Formula (2):

$$2NO \rightarrow N_2 + O_2 \quad (2)$$

Nitrogen dioxide is decomposed into nitrogen monoxide in the cathode layer 131, according to Formula (3):

$$2NO_2 \rightarrow 2NO + O_2 \quad (3)$$

Nitrogen monoxide (NO) is further decomposed into nitrogen and oxygen in the cathode layer 131.

The membrane-electrode assembly 13 is heated through the heating unit 20 to generate the electromotive force. Considering the system structure of the present invention and that precise temperature control is required for the heating unit 20, the heating unit 20 of the present invention can be realized with a porous electrical heating element. In one embodiment, the heating unit 20 can be a porous hollow electrical heating tube embedded between the anode compartment 12 of the cell module 10 and the membrane-electrode assembly 13 to heat the membrane-electrode assembly 13. In another embodiment, when the reducing gas is heated in the heat exchange unit 81, the heating unit 20 can be either a porous heat conducting element with effective heat transfer capability or a porous electrical heating element with effective heat transfer and conducting capability. However, the present invention is not limited by these embodiments. In one embodiment, the heating unit 20 can heat the membrane-electrode assembly 13 to a working temperature of 450-600° C. to generate the electromotive force. The working temperature can be appropriately decreased if the material of the electrolyte layer 133 has improved quality or the requirement of exhaust treatment is lowered. The working temperature can also be appropriately increased if the requirement of exhaust treatment is raised.

The oxidation catalyst layer 112 can catalyze a reaction to convert carbon monoxide (CO), hydrocarbons (HCs) and particulate matter (PM) into harmless gases, wherein carbon monoxide in the exhaust gas is oxidized into carbon dioxide, and hydrocarbons and particulate matter (C-containing matter) are oxidized into carbon dioxide and water respectively according to Formulae (4), (5) and (6):

$$2CO + O_2 \rightarrow 2CO_2 \quad (4)$$

$$HCs + O_2 \rightarrow H_2O + CO_2 \quad (5)$$

$$C + O_2 \rightarrow CO_2 \quad (6)$$

In one embodiment, the elements of the oxidation catalyst are made of a material selected from a group consisting of metal, alloy, fluorite oxides, perovskite oxides and other catalyst carriers, wherein the catalyst carrier might be aluminum oxides.

Figure 3:
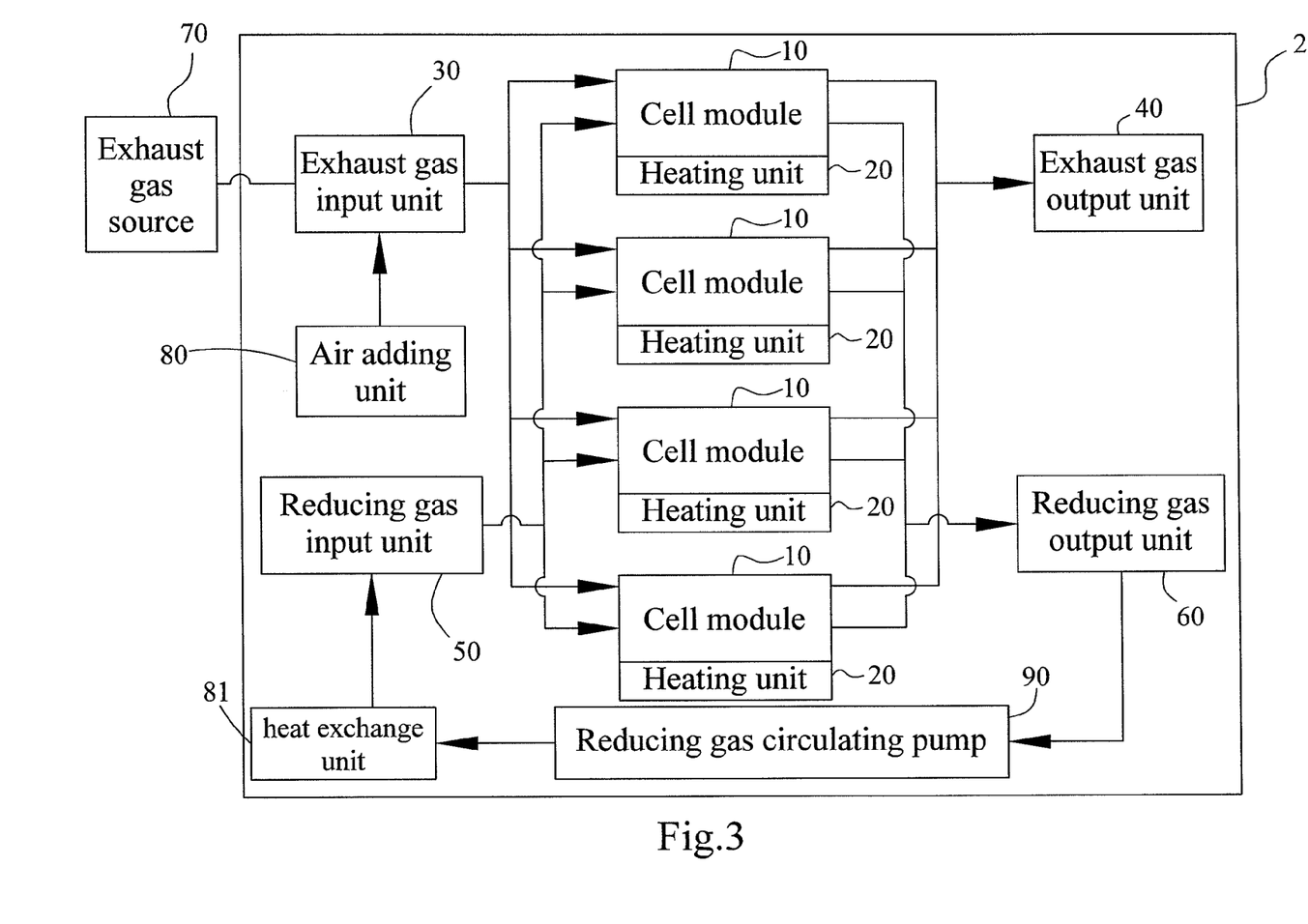
FIG. 3 is a diagram schematically showing the system of an electrochemical-catalytic converter according to another embodiment of the present invention.

Refer to FIG. 3 for the system of an electrochemical-catalytic converter according to another embodiment of the present invention. This embodiment is different from the preceding embodiment in that the electrochemical-catalytic converter 2 of this embodiment comprises a plurality of cell modules 10 and a plurality of heating units 20. The cell modules 10 are stacked one above one. The number of the heating units 20 is equal to or unequal to the number of the cell modules 10. No matter the number of the heating units 20 is equal to or unequal to that of the cell modules 10, the heating units 20 can heat the cell modules 10 to operate. The exhaust gas input unit 30 inputs exhaust gas to the cell modules 10 via different channels or pipes. The reducing gas input unit 50 also inputs reducing gas to the cell modules 10 via different channels or pipes. The cell modules 10 exhaust gas via different channels or pipes to the exhaust gas output unit 40 where the exhaust gas is gathered to be exhausted. The cell modules 10 also exhaust reducing gas via different channels or pipes to the reducing gas output unit 60 where the reducing gas is gathered to be recirculated. Thereby, the exhaust gas entering the electrochemical-catalytic converter 2 can be converted into unpolluted gas by more cell modules 10 to achieve higher exhaust gas treating efficiency.

In the present invention, the electrochemical-catalytic converters 1 and 2 can be connected in series or reversely connected in parallel to increase the efficiency of treating the exhaust gas or utilizing the heat. "Reversely connected in parallel" means that the stacking structure of the cell modules 10 is a planer SOFC (Solid Oxide Fuel Cell) stacking structure. Take a stacking structure of two cell modules 10 for an example, the layers in the cell module 10 shown in FIG. 2 are reversely arranged, such that one anode layer 132 in one cell module 10 and another anode layer 132 in another cell module 10 are coupled to an identical heating unit 20 in parallel. Thereby, the heating unit 20 can simultaneously heat the two cell modules 10; thus, the number of the heating units 20 can be decreased, and the efficiency of heat utilization can be increased.

Figure 4:
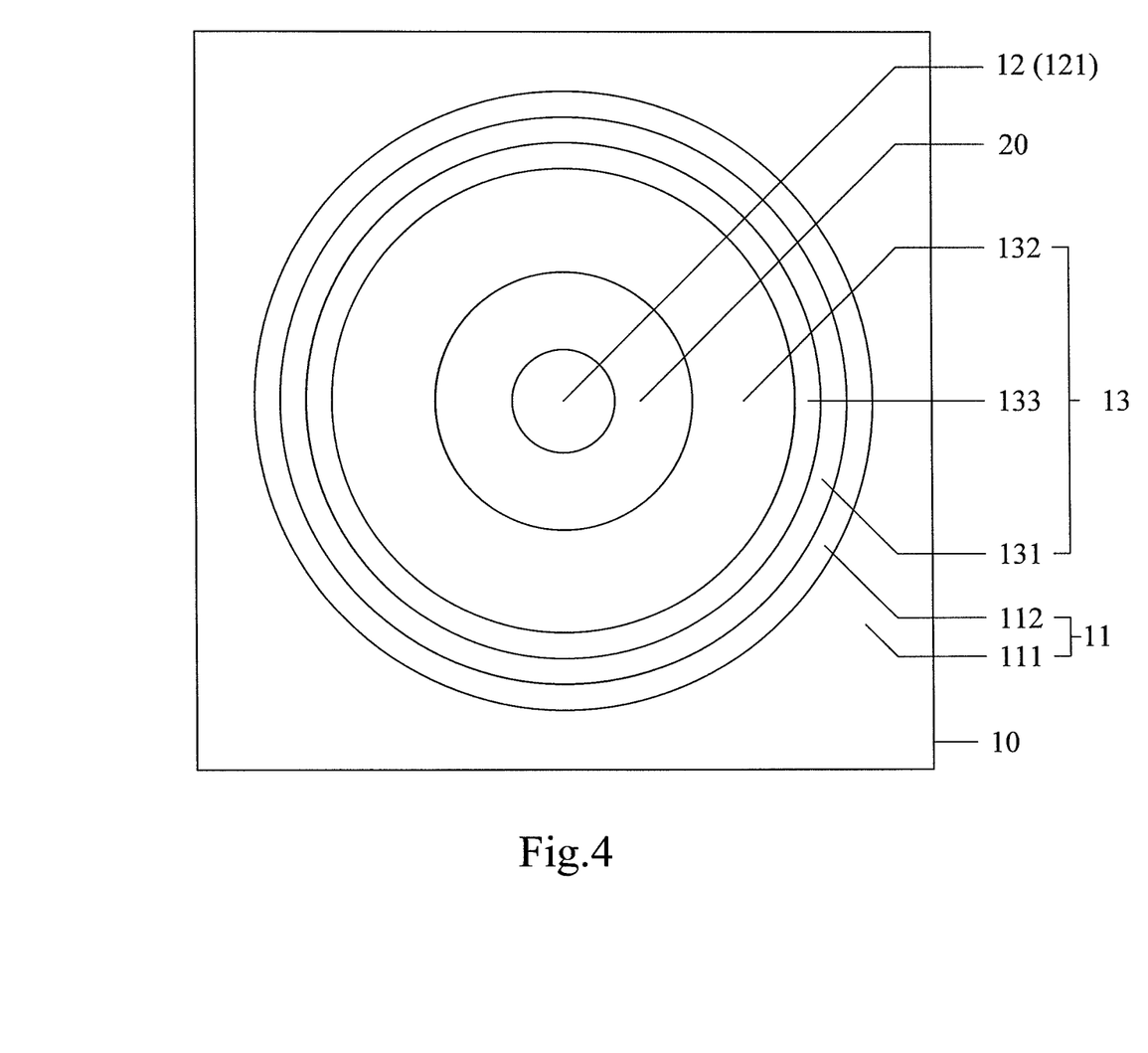
FIG. 4 is a diagram schematically showing the architecture of a cell module of an electrochemical-catalytic converter according to another embodiment of the present invention.

Refer to FIG. 4 for the architecture of a cell module 10 of an electrochemical-catalytic converter according to another embodiment of the present invention. As the operation principle is the same as the previous embodiments, only the structure differences are illustrated thereinafter. Comparing with the above mentioned embodiments, the cell module 10 in this embodiment is a tubular SOFC (Solid Oxide Fuel Cell) stacking structure. As shown in FIG. 4, the cell module 10 comprises an anode channel 121, a heating unit 20, a membrane-electrode assembly 13, and a cathode compartment 11 from the center to the outmost layer of the tubular structure in sequence. The membrane-electrode assembly 13 further includes an anode layer 132, an electrolyte layer 133, and a cathode layer 131 from the inner side to the outer side. The cathode compartment 11 further includes an oxidation catalyst layer 112 and a cathode channel 111 from the inner side to the outer side. The heating unit 20 is a porous hollow electrical heating tube embedded in the anode channel 121 and tightly contacted with the anode layer 132 for heating the cell module 10 to reach a working temperature. In another embodiment, when the reducing gas is heated in the heat exchange unit 81, the heating unit 20 can be either a porous heat conducting element with effective heat transfer capability or a porous electrical heating element with effective heat transfer and conducting capability. In one embodiment, the oxidation catalyst layer 112 can be made of metal, such as silver, palladium or platinum, and the oxidation catalyst layer 112 also can be made of fluorite oxides, such as gadolinia-doped ceria. In the present invention, with the electrochemical-catalytic converter 2 comprising a plurality of cell modules 10 with the tubular structure shown in FIG. 4, the cathode channels 111 of all cell modules 10 are interconnected; thus, there is no need to use different channels or pipes to input the exhaust gases from the exhaust gas input unit 30 to the cell modules 10 or to exhaust the gases from the cell modules 10 to the exhaust gas output unit 40.

Via the electrochemical promotion of decomposition reaction and catalytic oxidation reaction, the present invention can remove harmful components in the exhaust gas. In practice, the higher the oxygen concentration in the exhaust gas is, the higher the operation efficiency of the electrochemical-catalytic converters 1 and 2 can be. Therefore, the present invention is particularly suitable to apply to the exhaust gas treatment of lean burn engines, such as the exhaust emission systems of diesel vehicles. In addition, the present invention can treat $NO_x$ no matter how high the concentration of $NO_x$ is, thus there is no need for a diesel vehicle to additionally install an EGR (Exhaust Gas Recirculation) system to control emission of nitrogen oxides, and the oxygen content and temperature of the engine can be fully increased. Therefore, the generated high concentration of $NO_x$ in the engine can be easily removed, and the concentration of particulate matter in the engine can be reduced to eliminate the need for a particulate filter; the remaining particulate matter can be treated by the oxidation catalyst. In other words, the present invention integrates an $NO_x$ reduction system needed in the prior art and an oxidizing catalytic converter to achieve a better exhaust gas treating mechanism and higher exhaust gas treating efficiency compared with the conventional technology. At the same time, the oxygen content and temperature of the engine can be increased to improve the combustion efficiency, the fuel which originally generates particulate matter while adopting EGR is burned in the engine, thus the fuel can be greatly saved.

Furthermore, compared to the integrated structure of the exhaust gas conversion with power generation in the prior art, the present invention simplifies the circuit system, and the current collecting elements on the anode and cathode sides and the interconnectors for collecting electrical current are no longer needed. The oxidation catalyst layer 112 is no longer needed to be made of materials for collecting current, thus any material which can catalyze carbon monoxide, hydrocarbons and/or particulate matter can be utilized to take advantages of low cost, high efficiency, and easy fabrication. Based on the concept of circulation of the reducing gas, the reducing gas is repeatedly used in the present invention without the need to add reducing gas externally for a long-term internal use.

Also, the electrochemical-catalytic converter can be operated at the temperature of 450-600° C., and the heating unit 20 also can be used to quickly heat the membrane-electrode assembly 13 to a working temperature that is the same as the former integrated structure of the exhaust gas conversion with power generation. Later, the working temperature can be fully or partially maintained by the heat energy released from the decomposition and oxidation of the exhaust gas. It should be noted that the decomposition of nitric oxide and the oxidation of carbon monoxide, hydrocarbons and particulate matter on the cathode side are all exothermic reactions. The heat exchange unit 81 regulates the temperature of the reducing gas to further regulate the temperature of the membrane-electrode assembly 13 via the reducing gas circulating pump 90, such that the invention can handle the exhaust gas at any temperature in response to operation changes of the engine and changes of external environmental conditions through the function of regulating the temperature by the heating unit and the circulation of the reducing gas. In one embodiment, with the electrochemical-catalytic converter being used for automotive emission control, the reducing gas can be heated in the heat exchange unit 81, such as in a manifold, on the wall of the engine cylinder head. In another embodiment, the reducing gas can be heated in the heat exchange unit 81 which exchanges heat with an electrically heated source. In still another embodiment, when the membrane-electrode assembly 13 becomes too hot for an effective operation, the heat exchange unit 81 exposed to the ambient air can be used to cool the reducing gas to further cool the membrane-electrode assembly 13.

The embodiments described above are only to exemplify the present invention but not to limit the scope of the present invention. Any equivalent modification or variation according to the technical contents and drawings disclosed in the specification is to be also included within the scope of the present invention.

What is claimed is:

1. An electrochemical-catalytic converter, which is used to control exhaust emission, comprising:
    at least one cell module further including a cathode compartment, an anode compartment, a membrane-electrode assembly and a heating unit, the membrane-electrode assembly being interposed between the cathode compartment and the anode compartment, the heating unit being embedded in the cell module and interposed between the anode compartment and the membrane-electrode assembly, the cathode compartment including an oxidation catalyst;
    a reducing gas input unit and a reducing gas output unit respectively coupled to two sides of the anode compartment to function as a reducing gas input terminal and a reducing gas output terminal of the cell module for operating;
    a reducing gas circulating pump respectively coupled to the reducing gas input unit and the reducing gas output unit to perform closed circulation of reducing gas; and
    an exhaust gas input unit and an exhaust gas output unit respectively coupled to two sides of the cathode compartment to function as an exhaust gas input terminal and an exhaust gas output terminal of the cell module for treating exhaust gas;
    wherein the heating unit heats the membrane-electrode assembly to a working temperature to generate an electromotive force in the membrane-electrode assembly, and
    wherein nitrogen oxides in the exhaust gas are decomposed to form nitrogen in the membrane-electrode assembly, and
    wherein carbon monoxide, hydrocarbons and particulate matter in the exhaust gas are catalyzed to form carbon dioxide and water by the oxidation catalyst,
    whereby the exhaust gas is decontaminated.

2. The electrochemical-catalytic converter according to claim 1, wherein the membrane-electrode assembly further comprises a cathode layer, an anode layer and an electrolyte layer; the electrolyte layer being interposed between the cathode layer and the anode layer, and the cathode layer and the anode layer being respectively coupled to the cathode compartment and the anode compartment; the cathode compartment further including a cathode channel and an oxidation catalyst layer made of oxidation catalyst; the anode compartment further including an anode channel; wherein the heating unit being located in the anode channel; wherein the exhaust gas input unit is coupled to the cathode channel, and an oxidation reaction of the exhaust gas takes place in the cathode compartment, and the exhaust gas reaches the cathode layer to perform decomposition; the reducing gas input unit is coupled to the anode channel, and the reducing gas reaches the anode layer to generate the electromotive force.

3. The electrochemical-catalytic converter according to claim 2, wherein the cathode compartment, the membrane-electrode assembly, the heating unit and the anode compartment are stacked one by one, and the cathode channel, the oxidation catalyst layer, the cathode layer, the electrolyte layer, the anode layer, the heating unit and the anode channel are stacked in sequence.

4. The electrochemical-catalytic converter according to claim 2, wherein the anode compartment, the heating unit, the membrane-electrode assembly, and the cathode compartment are stacked in a tubular structure; the anode channel being located in the center of the tubular structure, and the heating unit, the anode layer, the electrolyte layer, the cathode layer, the oxidation catalyst layer and the cathode channel being stacked and surrounding the anode channel in sequence.

5. The electrochemical-catalytic converter according to claim 2, wherein the working temperature is between 450 and 600° C.

6. The electrochemical-catalytic converter according to claim 2, wherein the oxidation catalyst is made of a material selected from a group consisting of metal, alloy, fluorite oxides, perovskite oxides, and the combinations thereof.

7. The electrochemical-catalytic converter according to claim 2, wherein the oxidation catalyst covers the cathode channel in form of microparticles.

8. The electrochemical-catalytic converter according to claim 2, wherein the oxidation catalyst covers the cathode layer in form of microparticles.

9. The electrochemical-catalytic converter according to claim 2, wherein the electrolyte layer is made of a material selected from a group consisting of fluorite oxides, perovskite oxides, and the combinations thereof.

10. The electrochemical-catalytic converter according to claim 2, wherein the anode layer is made of a material selected from a group consisting of cermet of nickel and fluorite oxides, perovskite oxides, fluorite oxides, metal-added perovskite oxides, metal-added fluorite oxides, and the combinations thereof.

11. The electrochemical-catalytic converter according to claim 2, wherein the cathode layer is made of a material selected from a group consisting of perovskite oxides, fluorite oxides, metal-added perovskite oxides, metal-added fluorite oxides, and the combinations thereof.

12. The electrochemical-catalytic converter according to claim 1, wherein the exhaust gas input unit includes an air adding unit for adding air into the exhaust gas.

13. The electrochemical-catalytic converter according to claim 1, wherein the reducing gas is made of a material selected from a group consisting of hydrogen ($H_2$), a mixed gas of carbon monoxide and carbon dioxide, a mixed gas of carbon monoxide and hydrogen, natural gas, and the combinations thereof.

14. The electrochemical-catalytic converter according to claim 1, wherein the reducing gas circulating pump includes at least one heat exchange unit to regulate the temperature of the reducing gas.

15. The electrochemical-catalytic converter according to claim 1, wherein the heating unit is a porous electrical heating element.

16. The electrochemical-catalytic converter according to claim 1, wherein the heating unit is a porous heat conducting element.

* * * * *